United States Patent [19]

Klein

[11] 4,081,835

[45] Mar. 28, 1978

[54] BLANKING CIRCUITRY FOR A TELEVISION RECEIVER VIDEO SYSTEM

[75] Inventor: Arthur H. Klein, Attica, N.Y.

[73] Assignee: GTE Sylvania Incorporated, Stamford, Conn.

[21] Appl. No.: 760,364

[22] Filed: Jan. 19, 1977

[51] Int. Cl.² .............................................. H04N 3/24
[52] U.S. Cl. ...................................... 358/165; 358/33
[58] Field of Search .................................. 358/33, 165

[56] References Cited

U.S. PATENT DOCUMENTS

| | | | |
|---|---|---|---|
| 3,184,547 | 5/1965 | Dome | 358/165 X |
| 3,247,418 | 4/1966 | Hansen et al. | 358/33 X |
| 3,879,637 | 4/1975 | Woodworth | 358/165 X |

Primary Examiner—Robert L. Griffin
Assistant Examiner—Aristotelis M. Psitos
Attorney, Agent, or Firm—Theodore D. Lindgren

[57] ABSTRACT

A blanking circuit for providing blanking pulses to a video system for a television receiver is disclosed. The blanking circuit is particularly adapted for fabrication in integrated circuit form and can advantageously be incorporated in an integrated circuit video processing system. The blanking circuit is adapted to receive retrace pulses of either polarity.

10 Claims, 2 Drawing Figures

BLANKING CIRCUITRY FOR A TELEVISION RECEIVER VIDEO SYSTEM

CROSS REFERENCE TO RELATED APPLICATION

R. C. Wheeler, "Video Processing System," application Ser. No. 760,284, filed on the same date and assigned to the same assignee as this application.

FIELD OF THE INVENTION

This invention relates to blanking circuitry for a television receiver video system and more particularly to a blanking circuit capable of receiving either positive-going or negative-going pulses and providing blanking pulses in response thereto.

BACKGROUND OF THE INVENTION

The detected composite video signal in television receivers includes pulses which occur during the retrace intervals of the video signal. These blanking pulses are transmitted at "black level" so that the electron gun or guns of the cathode ray tube are turned off during the time that the deflection voltages are causing the electron beams to retrace. Blanking pulses are included for both the horizontal and vertical retrace intervals.

Although the horizontal and vertical blanking pulses are included in the received composite video signal, it has long been the practice to utilize auxiliary blanking pulses to assure complete blanking of the cathode ray tube during retrace. Such auxiliary blanking pulses are typically derived from the horizontal and vertical deflection circuitry and applied to the video amplifier.

The video processing system can also include automatic control circuitry such as that disclosed in Rhee et al. U.S. Pat. No. 3,947,631 or the cross-reference to co-pending application. Video processing by such systems typically requires additional blanking to prevent the automatic control circuitry from "setting-up" on retrace interval signals included in the composite video signal. Since the video processing circuitry is typically fabricated in integrated circuit form, it is desirable to include the blanking circuitry in the same integrated circuit.

The retrace pulses which are applied to the blanking circuit in typical television receivers can be derived from various points in the deflection circuits. Such retrace pulses can be either positive-going or negative-going depending upon the point in the deflection circuit from which they are developed. It is highly desirable, however, to have a single integrated circuit design which can be used in all television receivers. Known prior art blanking circuits, however, can accommodate only positive-going or only negative-going retrace pulses or, alternatively, require different input pins for the different pulses. Since additional pins on an integrated circuit require additional expense and connections to the integrated circuit are a primary source of failure, it is highly desirable to avoid the necessity of separate inputs to the blanking circuit.

OBJECTS OF THE INVENTION

Accordingly, it is a primary object of this invention to obviate the above-noted and other disadvantages of the prior art.

It is a further object of this invention to provide a new and novel blanking circuit.

It is a further object of this invention to provide a new and novel blanking circuit which can be readily fabricated in integrated circuit form together with other circuitry.

It is a further object of this invention to provide a blanking circuit which can accommodate either positive-going or negative-going retrace pulses.

SUMMARY OF THE INVENTION

In one aspect of this invention the above and other objects and advantages are achieved in a blanking circuit for a television receiver video system. The blanking circuit includes first and second transistors which have emitters connected together, means connected to the base of the first transistor for coupling negative-going pulses at a deflection rate to the base of the first transistor to cause the first transistor to switch to a nonconducting state, and means connected to the base of the second transistor for coupling positive-going pulses at a deflection rate to the base of the second transistor to cause the second transistor to switch to a conducting state. The blanking circuit further includes output means connected to the collector of at least one of the first and second transistors for deriving a blanking signal therefrom.

DETAILED DESCRIPTION OF THE PREFERRED EMBODIMENT

Figures 1, 2:
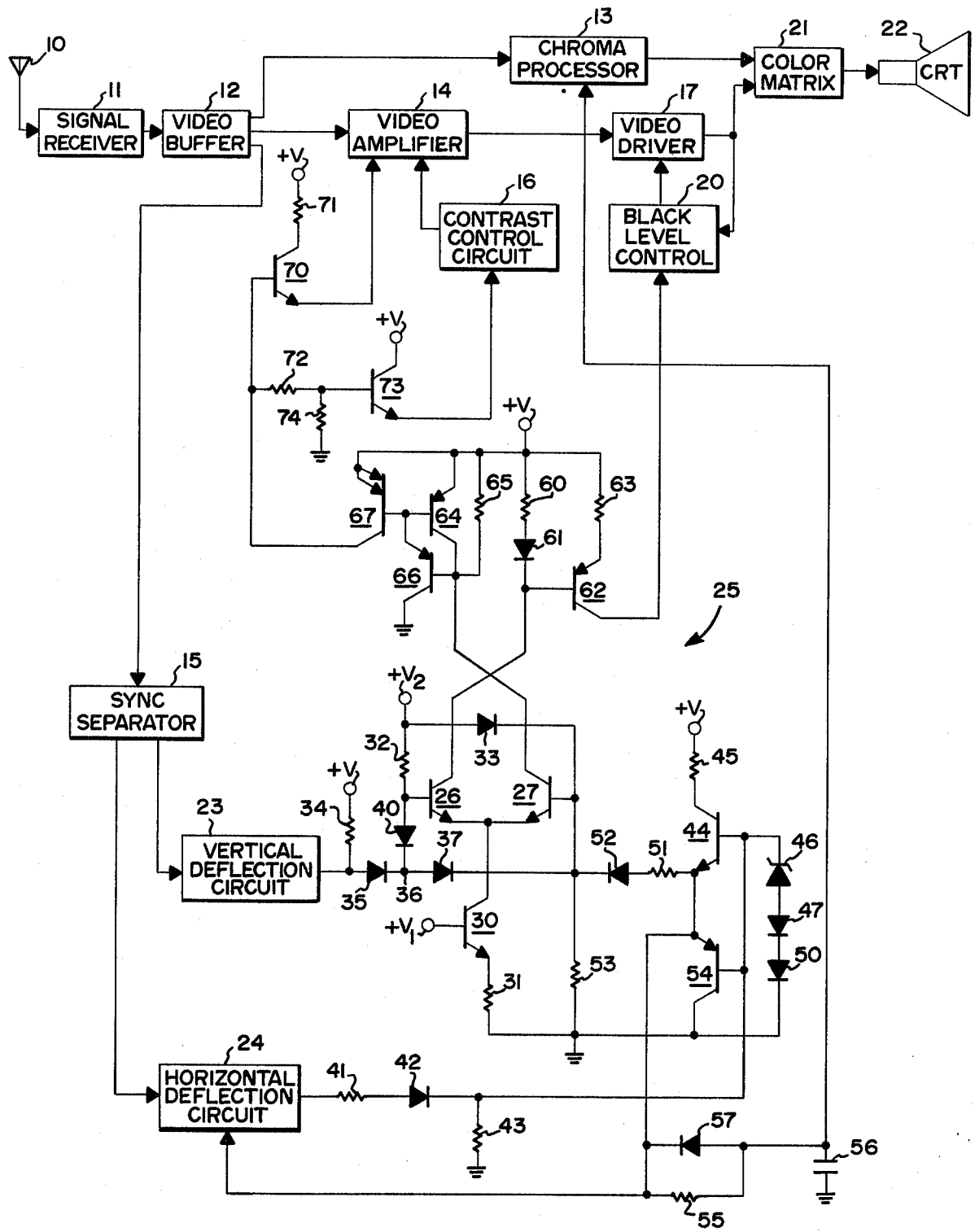
FIG. 1 is a block and schematic diagram of a preferred embodiment of the invention.
FIG. 2 is a schematic illustration of a modification of the invention to accept negative-going retrace pulses.

For a better understanding of the present invention, together with other and further objects, advantages and capabilities thereof, reference is made to the following disclosure in conjunction with the accompanying drawings.

In FIG. 1 typical components of a television receiver are illustrated on block diagram form with the invention being illustrated schematically. An antenna 10 or equivalent signal receiving means is connected to an input of a signal receiver 11. Signal receiver 11 receives an RF carrier modulated by a composite video signal and processes the received signal to provide a composite video signal to a video buffer 12. Video buffer 12 provides the composite video signal to a chroma processor 13, a video amplifier 14, and a synchronizing pulse separator 15. Video amplifier 14 also receives the output of a contrast control circuit 16 and provides an output to a video driver 17. The output of video driver 17 is coupled to a black level control 20 which provides a black level control signal to video driver 17. Video driver 17 can be considered the output stages of the video amplifier. The output of video driver 17 is also connected to a color matrix circuit 21 which receives the output of chroma processor 13. Color matrix circuit 21 provides one or more output signals to an image display device illustrated as a cathode ray tube (CRT) 22.

Contrast control 16 can be an automatic contrast control which receives a feedback signal to automatically control the contrast in accordance with that illustrated and described in the cross-referenced co-pending application. In addition, video amplifier 14 can include aperture correction and automatic peaking circuitry of the type disclosed in the cross-referenced co-pending application. Video driver 17 and black level control 20 can also be in accordance with that disclosed in the cross-referenced co-pending application. As is disclosed therein, video amplifier 14, contrast control circuit 16, video driver 17, and black level control 20 can be included in an integrated circuit together with the blanking circuit illustrated schematically herein.

Sync separator 15 provides separated vertical synchronizing pulses to a vertical deflection circuit 23 and separated horizontal synchronizing pulses to a horizontal circuit 24. Deflection circiuts 23 and 24 include deflection windings associated with CRT 22 to deflect the electron beams in CRT 22. Retrace pulses at the vertical deflection rate are coupled from vertical deflection circuit 23 to a blanking circuit 25. Similarly, retrace pulses at the horizontal deflection rate are coupled from horizontal deflection circuit 24 to blanking circuit 25. Blanking circuit 25 provides blanking signals to, for example, video amplifier 14, the automatic contrast control circuitry in block 16, and the black level control circuitry in block 20.

Blanking circuit 25 includes first and second transistors 26 and 27 which have emitters connected together. A transistor 30 has a collector connected to the emitters of transistors 26 and 27, a base connected to a source of bias voltage illustrated as a terminal $+V_1$, and an emitter connected by a resistor to a common conductor illustrated as circuit ground. Transistor 30 and resistor 31 comprise a current source for transistors 26 and 27. A means for biasing the bases of transistors 26 and 27 includes a source of bias voltage illustrated as a terminal $+V_2$ connected by a resistor 32 to the base of transistor 26 and by a diode 33 to the base of transistor 27.

An output of vertical deflection circuit 23 is connected by a resistor 34 to a source of energizing voltage illustrated as a terminal $+V$. The output of vertical deflection circuit 23 is further connected by a unidirectional conduction device illustrated as a programming diode 35 to a terminal 36 which can be a pin on the integrated circuit that includes blanking circuit 25. Terminal 36, which comprises an input terminal of blanking circuit 25, is connected by a diode 37 to the base of transistor 27. The base of transistor 26 is connected by a diode 40 to terminal 36. Diode 37 comprises a means connected to the base of transistor 27 for coupling positive-going pulses at a deflection rate to the base of transistor 27. Similarly, diode 40 comprises a means connected to the base of transistor 26 for coupling negative-going pulses at a deflection rate to the base of transistor 26.

An output of horizontal deflection circuit 24 is connected by a resistor 41 in series with a diode 42 and a resistor 43 to circuit ground. The junction of diode 42 and resistor 43 is connected to a base of a transistor 44 which has a collector connected by a resistor 45 to source $+V$. The base of transistor 44 is further connected by a zener diode 46 in series with diodes 47 and 50 to circuit ground. Diodes 46, 47, and 50 comprise a means for limiting the voltage at the base of transistor 44. An emitter of transistor 44 is connected by a resistor 51 in series with a diode 52 to the base of transistor 27. The base of transistor 27 is further connected by a resistor 53 to circuit ground. Transistor 44 and its associated circuitry comprise a means connected to the base of transistor 27 for coupling pulses at a second deflection rate thereto.

The junction between diode 42 and resistor 43 is further connected to a base of a transistor 54 which has an emitter connected to the emitter of transistor 44 and a collector connected to circuit ground. The emitter of transistor 54 is further connected to an input of horizontal deflection circuit 24. The emitter of transistor 54 is further connected by a resistor 55 to an input of chroma processor 13. The input of chroma processor 13 is further connected by a capacitor 56 to circuit ground and by a diode 57 to the emitter of transistor 54.

An output means is connected to the collector of at least one of transistors 26 and 27 for deriving a blanking signal therefrom. In the illustrated embodiment, source $+V$ is connected by a resistor 60 in series with a diode 61 to the collector of transistor 26. The collector of transistor 26 is further connected to a base of a transistor 62 which has an emitter connected by a resistor 63 to source $+V$ and a collector connected to black level control 20.

A transistor 64 has an emitter connected to source $+V$ and a collector connected to the collector of transistor 27. The collector of transistor 27 is further connected by a resistor 65 to source $+V$ and to a base of a transistor 66 which has a collector connected to circuit ground. An emitter of transistor 66 is connected to a base of transistor 64 and to a base of a transistor 67. Transistor 67 is illustrated as having two emitters connected to source $+V$. A collector of transistor 67 is connected to a base of a transistor 70 which has a collector connected by a resistor 71 to source $+V$ and an emitter connected to an input of video amplifier 14. The collector of transistor 67 is further connected by a resistor 72 to a base of a transistor 73 which is further connected by a resistor 74 to circuit ground. A collector of transistor 73 is connected to source $+V$ and an emitter is connected to contrast control circuit 16.

In operation, the base voltage of transistor 26 is held at approximately $+V_2$, while the base voltage of transistor 27 is approximately 0.7 volts less than $+V_2$ due to the forward volt drop across diode 33. Accordingly, transistor 26 is normally in a conducting state or ON while transistor 27 is normally in a non-conducting state or OFF. Thus, current flows from source $+V$ through resistor 60, diode 61, transistor 26, transistor 30, and resistor 31 to ground. Diode 61, transistor 62, and resistors 60 and 63 form a current source or current mirror which supplies current to black level control 20.

When a horizontal retrace pulse is provided by horizontal deflection circuit 24, the pulse is coupled across the resistor divider including resistors 41 and 43. The pulse across resistor 43 is coupled to the bases of transistors 44 and 54. Zener diode 46 and diodes 47 and 50 limit the amplitude of the pulse at the base of transistor 44 to a desired value. The pulse turns transistor 44 ON and turns transistor 54 OFF. When transistor 44 switches ON, the pulse is coupled via resistor 51 and diode 52 to the base of transistor 27 to increase the voltage at the base of transistor 27 sufficiently to switch transistor 27 to a conducting state or ON. Since the emitters of transistors 26 and 27 are connected together, transistor 26 is switched to a non-conducting state or OFF. Accordingly, the current through the current source including transistor 30 and resistor 31 is switched from transistor 26 to transistor 27. When no collector current flows through transistor 26, transistor 62 is turned OFF to interrupt the energization current for black level control 20 thereby blanking black level control 20.

Current flow through transistor 27 energizes the current multiplier including transistors 64, 66, and 67 to provide a current pulse to transistors 70 and 73. Transistors 70 and 73 are turned ON to blank video amplifier 14 and contrast control circuit 60. Transistors 64, 66, and 67 are a typical current multiplier. Transistor 64 is the reference for the multiplier. Transistor 67 has twice the emitter area, and twice the collector current, of transistor 64 so that the collector current of transistor 67 is twice the collector current of transistor 27. Transistor 66 supplies the additional base drive required to assure proper conduction by transistor 67. When transistors 64, 66, and 67 are intended to be OFF, resistor 65 provides compensation so that leakage currents through transistor 64 will not turn transistor 66 ON.

Accordingly, horizontal retrace pulses are coupled via transistor 44 to the base of transistor 27 to cause transistors 26 and 27 to switch conducting states. When transistors 26 and 27 switch conducting states, the output means connected to their collectors provide blanking signals or pulses to the video system. These blanking pulses switch the video system to a particular operating state such that CRT 22 is blanked during retrace.

The horizontal retrace pulses can be derived from a suitable point in horizontal deflection circuit 24 such as the collector of the horizontal output transistor or a secondary winding on the horizontal output transformer or the like. Diode 42 blocks reverse or negative signals which otherwise could cause damage to components in the integrated circuit.

Various other circuits require pulses at the horizontal deflection rate. Such pulses can conveniently be obtained from the emitters of transistors 44 and 54. For example, horizontal deflection circuit 24 typically includes an AFC loop to lock the frequency and phase of the horizontal output pulses to the received synchronizing pulses. The feedback pulses for the AFC loop can be obtained from the emitters of transistors 44 and 54. Also, the burst gate signal for chroma processor 13 can be obtained from transistors 44 and 54.

Vertical deflection circuit 23 provides retrace pulses at the vertical deflection rate. During non-retrace intervals, the output of vertical deflection 23 is low so that no signals are coupled to transistors 26 and 27 via diodes 35, 37, and 40. Diode 35 prevents reverse current flow out of junction 36 which can correspond to a pin on the integrated circuit. Positive-going retrace pulses at the vertical deflection rate are coupled from vertical deflection circuit 23 via diodes 35 and 37 to the base of transistor 27 to cause transistor 27 to switch to a conducting state and transistor 26 to switch to a non-conducting state. The output means connected to the collectors of transistors 26 and 27 operates in the same manner as for horizontal blanking pulses to provide vertical blanking pulses to video amplifier 14, contrast control circuit 16, and black level control 20.

In accordance with typical integrated circuit practice for providing large resistance, resistor 53 is a pinch resistor, that is, a biased field-effect transistor (FET). Since the FET incorporates a PN junction which will zener, resistor 53 is designed to zener at a predetermined voltage to limit the base voltage at transistor 27 to a safe value.

FIG. 2 is a schematic illustration of a modification of FIG. 1 when only negative-going retrace pulses at the vertical deflection rate are available from vertical deflection circuit 23. In FIG. 2, resistors 80 and 81 are connected in series between the output of vertical deflection circuit 23 and circuit ground. Diode 35 is reversed from FIG. 1 and connected between junction 36 and the junction of resistors 80 and 81. Accordingly, negative-going retrace pulses at the vertical deflection rate are coupled via diode 35 and diode 40 of FIG. 1 to the base of transistor 26 to overcome the bias thereon. Accordingly, negative-going retrace pulses at the vertical deflection rate cause transistor 26 to switch to a non-conducting state, while transistor 27 switches to a conducting state, to provide blanking pulses via the output means connected to the collectors of transistors 26 and 27.

Accordingly, a preferred embodiment of a blanking circuit in accordance with the invention has been shown and described. Either positive-going or negative-going retrace pulses at a deflection rate can be accommodated with minimal external circuit changes and without the use of separate input pins to the integrated circuit. While the preferred embodiment has been illustrated with either positive-going or negative-going retrace pulses at the vertical deflection rate, those skilled in the art will realize that the invention is also usable with positive-going or negative-going retrace pulses at the horizontal deflection rate. While particular output means have been shown, those skilled in the art will also realize that the particular output means utilized will depend upon the video system blanking requirements.

While there has been shown and described what is at present considered the preferred embodiment of the invention it will be obvious to those skilled in the art that various changes and modifications may be made therein without departing from the invention as defined by the appended claims.

What is claimed is:

1. A blanking circuit for a television receiver video system comprising:

first and second transistors having emitters connected together;

means for biasing the bases of said transistors to cause said first transistor to be in a conducting state and said second transistor to be in a non-conducting state;

means connected to the base of said first transistor for coupling negative-going pulses at a deflection rate to the base of said first transistor to cause said first transistor to switch to a non-conducting state and said second transistor to switch to a conducting state;

means connected to the base of said second transistor for coupling positive-going pulses at said deflection rate to the base of said second transistor to cause said second transistor to switch to a conducting state and said first transistor to switch to a non-conducting state; and output means connected to the collector of at least one of said first and second transistors for deriving a blanking signal therefrom.

2. A blanking circuit as defined in claim 1 further including means connected to the base of said second transistor for coupling pulses at a second deflection rate thereto to cause said second transistor to switch to a conducting state and said first transistor to switch to a non-conducting state.

3. A blanking circuit as defined in claim 2 wherein said first-named deflection rate is the vertical deflection rate and said second deflection rate is the horizontal deflection rate.

4. A blanking circuit as defined in claim 1 wherein said means for coupling negative-going pulses is a diode connected between the base of said first transistor and a terminal and said means for coupling positive-going pulses is a diode connected between said terminal and the base of said second transistor.

5. A blanking circuit as defined in claim 1 wherein said video system includes a video amplifier and a black level control connected thereto and said output means includes a current multiplier connected to the collector of said second transistor and to said video amplifier and a current source connected to the collector of said first transistor and to said black level control.

6. In a television receiver video system having a video amplifier and a black level control connected thereto, a blanking circuit for blanking said video amplifier and said black level control comprising:
   first and second transistors having emitters connected together;
   an input terminal for receiving pulses at a deflection rate;
   means connected from said input terminal to the base of said first transistor for coupling negative-going pulses to the base of said first transistor to cause said first transistor to switch to a non-conducting state;
   means connected from said input terminal to the base of said second transistor for coupling positive-going pulses to the base of said second transistor to cause said second transistor to switch to a conducting state; and
   output means connected to the collector of at least one of said first and second transistors and to said video amplifier and said black level control for switching said video amplifier and said black level control to a blanked condition in response to conduction by said second transistor and non-conduction by said first transistor.

7. A blanking circuit as defined in claim 6 further including means connected to the base of said second transistor for coupling pulses at a second deflection rate thereto to cause said second transistor to switch to a conducting state and said first transistor to switch to a non-conducting state.

8. A blanking circuit as defined in claim 7 wherein said first-named deflection rate is the vertical deflection rate and said second deflection rate is the horizontal deflection rate.

9. A blanking circuit as defined in claim 6 wherein said means for coupling negative-going pulses is a diode connected between the base of said first transistor and said input terminal and said means for coupling positive-going pulses is a diode connected between said input terminal and the base of said second transistor.

10. A blanking circuit as defined in claim 6 further including means for biasing the bases of said transistors to cause said first transistor to be in a conducting state and said second transistor to be in a non-conducting state, and wherein said output means includes a current multiplier connected to the collector of said second transistor and to said video amplifier and a current source connected to the collector of said first transistor and to said black level control.

* * * * *